United States Patent
Benson et al.

(10) Patent No.: US 6,192,033 B1
(45) Date of Patent: *Feb. 20, 2001

(54) METHOD AND SYSTEM FOR USING RESOURCE MANAGEMENT CELLS IN AN ATM NETWORK

(75) Inventors: Michael H. Benson, New Castle; Nhiem Nguyen, Cranberry; Steven J. Schlick, Wexford; George Totolos, Jr., Cranberry, all of PA (US)

(73) Assignee: FORE Systems, Inc., Warrendale, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/970,635

(22) Filed: Nov. 14, 1997

(51) Int. Cl.[7] .................................................. G01R 31/08
(52) U.S. Cl. ............................ 370/236; 370/230; 370/229
(58) Field of Search .................................. 370/229, 231, 370/232, 236, 237, 412, 409, 366

(56) References Cited

U.S. PATENT DOCUMENTS

| | | | |
|---|---|---|---|
| 5,457,687 | * 10/1995 | Newman | 370/232 |
| 5,497,375 | * 3/1996 | Hluchyj | 370/232 |
| 5,515,363 | * 5/1996 | Ben-Nun | 370/232 |
| 5,633,870 | * 5/1997 | Gaytan | 370/235 |
| 5,745,490 | * 4/1998 | Ghufran | 370/397 |
| 5,754,530 | * 5/1998 | Awdeh | 370/232 |
| 5,777,984 | * 7/1998 | Gun | 370/236 |
| 5,898,669 | * 4/1999 | Shimony | 370/232 |
| 5,909,443 | * 6/1999 | Fichou | 370/412 |
| 5,940,375 | * 8/1999 | Soumiya | 370/249 |

* cited by examiner

Primary Examiner—Douglas W. Olms
Assistant Examiner—Ricardo M. Pizarro
(74) Attorney, Agent, or Firm—Ansel M. Schwartz

(57) ABSTRACT

An apparatus for reflecting an f-RM cell as a b-RM cell. The apparatus includes an RM cell processor which is adapted to receive the f-RM cell from an ATM network and modifies ABR information of the f-RM cell to reflect congestion regarding cells on the ATM network. The apparatus includes a transmit scheduler connected to the RM cell processor which forms the b-RM cell from the modified ABR information of the f-RM cell and sends the b-RM cell to the ATM network. The transmit scheduler is decoupled from the RM cell processor. An ATM telecommunications system. A method for reflecting an f-RM cell as a b-RM cell.

40 Claims, 5 Drawing Sheets

RECEIVE SIDE STATE MACHINE

METHOD AND SYSTEM FOR USING RESOURCE MANAGEMENT CELLS IN AN ATM NETWORK

CROSS-REFERENCE

This application is related to contemporaneously filed U.S. patent application Ser. No. 08/971,170, titled "Method and System for Sending ATM Cells to an ATM Network From a Host", by Michael H. Benson, Nhiem Nguyen, Steven J. Schlick and George Totolos, Jr., incorporated by reference herein; and is related to contemporaneously filed U.S. patent application Ser. No. 08/970,636 titled "Method and System for Receiving ATM Cells to an ATM Network by a Host" by Michael H. Benson, Nhiem Nguyen, Steven J. Schlick and George Totolos, Jr., incorporated by reference herein.

FIELD OF THE INVENTION

The present invention is related to resource management of an ATM network. More specifically, the present invention is related to reflecting f-RM cells as b-RM cells for resource management of an ATM network.

BACKGROUND OF THE INVENTION

The ATM Forum Traffic Management Specification Version 4.0 (the "TM Spec") identifies an available bit rate (ABR) service class for ATM networks. Central to the service is the use of resource management (RM) cells. RM cells are transmitted in-band with ATM data traffic to communicate necessary changes to connections' data transmission rates in response to the congestion state of the network.

FIG. 1 illustrates a bi-directional connection between two ATM Endpoints (Endpoints A and B). The directions of the connection are labelled X and Y. Endpoint A sends data to Endpoint B encapsulated in ATM data cells. The data cells are interspersed with forward resource management cells (f-RM cells) on the same connection. Resource management cells are differentiated from ATM data cells by a bit pattern in the cell header. The cells (data and RM) may traverse one or more switches between the Endpoints.

When the cells arrive at Endpoint B, the data cells are processed and retained by the endpoint, while the f-RM cells are converted to backward resource management cells (b-RM cells) and sent back to Endpoint A on the same connection in Direction Y. When Endpoint A receives the b-RM cells, the rate of data transmission in Direction X may change as a function of the contents of the b-RM cells.

At the same time Endpoint A is transmitting data and f-RM cells to Endpoint B, Endpoint B may be transmitting data and f-RM cells to Endpoint A on the same connection. In this case, in both Direction X and Y there will be a mix of data, f-RM and b-RM cells on the same connection.

Section 5.10 of the TM Spec describes the required and allowed behavior for sending and receiving data, f-RM and b-RM cells. There are two sub-classes of b-RM cells which are at issue. In-rate b-RM cells have a higher priority in the network and are marked with a value of CLP=0 in the ATM cell header. Out-of-rate b-RM cells have a lower priority and are marked with a value of CLP=1.

Section 5.10.4 of the TM Spec (Source Behavior), item 3.b specifies that an in-rate b-RM cell may be sent if either: i) no other b-RM cell has been sent on the connection since the last f-RM cell was sent, or ii) no data cell is waiting for transmission.

The problem with this approach alone is that there may be no rate allocated in the reverse direction to carry the reflected b-RM cell in-rate. For example, Endpoint A may send data and f-RM cells to Endpoint B, but Endpoint B may be sending nothing to Endpoint A. In this case, no b-RM cells can be reflected in-rate to Endpoint A.

To overcome this deficiency, an Endpoint may choose to reflect b-RM cells out-of-rate. b-RM cells may be sent out-of-rate with CLP=1 regardless of the allocated rate of the connection in the reverse direction. Section 5.10.5.3 of the TM Spec states:

3. If a forward-RM cell is received by the destination while another turned-around RM-cell (on the same connection) is scheduled for in-rate transmission:

a) It is recommended that the contents of the old cell are over-written by the contents of the new cell;

b) It is recommended that the old cell (after possibly having been over-written) shall be sent out-of-rate; alternatively the old cell may be discarded or remain scheduled for in-rate transmission.

c) It is required that the new cell be scheduled for in-rate transmission.

In addition to the main specification for RM cell behavior, the TM Spec includes an appendix (Appendix 1.7: Turning RM-Cells Around) which enumerates several options for reflecting b-RM cells in-rate and out-of-rate. The Appendix in particular addresses the situation where the backward rate is much lower than the forward rate or equal to zero. However, the proposed solutions contain several deficiencies.

One deficiency is the assumption that the scheduler in the forward direction can transmit a reflected b-RM cell at any instant in time. However, the transmit scheduler may have other traffic with a higher priority and may need to be decoupled from the cell receiving processing.

Another problem not addressed in the Appendix is when clumps of f-RM cells are received and then reflected as a clump of out-of-rate b-RM cells. The only solution to this problem presented in the Appendix is to not reflect RM cells out-of-rate, which is not acceptable when the backward rate is zero.

The present invention specifies a method for reflecting b-RM cells in-rate and out-of-rate which:

Does not require an allocated cell rate in the reverse direction

Provides decoupling between the receive and transmit sections.

Controls clumping of RM cells on reflection.

Minimizes latency in reflecting RM cells to the source.

Eliminates the need to buffer entire RM cells for reflection.

SUMMARY OF THE INVENTION

The present invention pertains to an apparatus for reflecting an f-RM cell as a b-RM cell. The apparatus comprises an RM cell processor which is adapted to receive the f-RM cell from an ATM network and modifies ABR information of the f-RM cell to reflect congestion regarding cells on the ATM network. The apparatus comprises a transmit scheduler connected to the RM cell processor which forms the b-RM cell from the modified ABR information of the f-RM cell and sends the b-RM cell to the ATM network. The transmit scheduler is decoupled from the RM cell processor.

The present invention pertains to an ATM telecommunications system. The system comprises an ATM network on which cells travel. The system comprises a first node connected to the ATM network which produces at least a first f-RM cell and sends it onto the ATM network. The f-RM cell includes ABR information. The system comprises a second node connected to the ATM network. The second node has a receive section which receives the f-RM cell and a transmit section which produces a corresponding b-RM cell in response to the f-RM cell and which sends the b-RM cell on to the ATM network back to the first node. The b-RM cell includes the ABR information received from the corresponding f-RM cell and modifies the ABR information to reflect congestion regarding cells on the ATM network. The receive section is decoupled from the transmit section.

The present invention pertains to a method for reflecting an f-RM cell as a b-RM cell. The method comprises the steps of receiving an f-RM cell. Then there is the step of modifying ABR information in a f-RM cell received from an ATM network to reflect congestion regarding cells on the ATM network with an RM processor. Then there is the step of forming a b-RM cell with the modified ABR information using a transmit scheduler. Next there is the step of sending the b-RM cell to the ATM network with the transmit scheduler.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
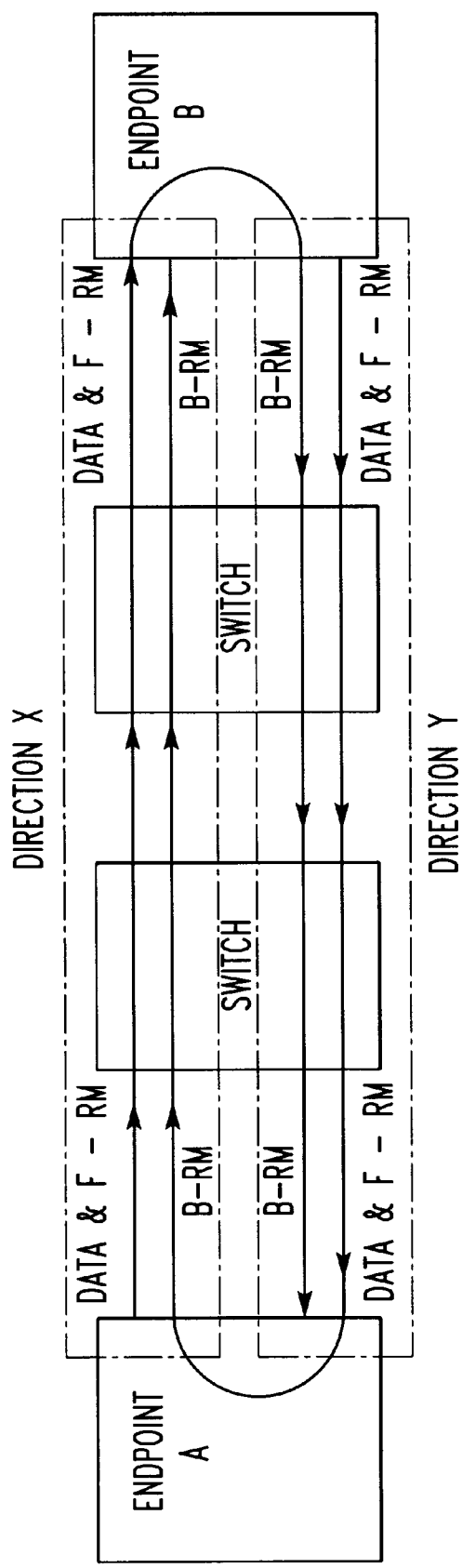
FIG. 1 is a schematic representation of an ATM network with resource management cells.
Figure 2:
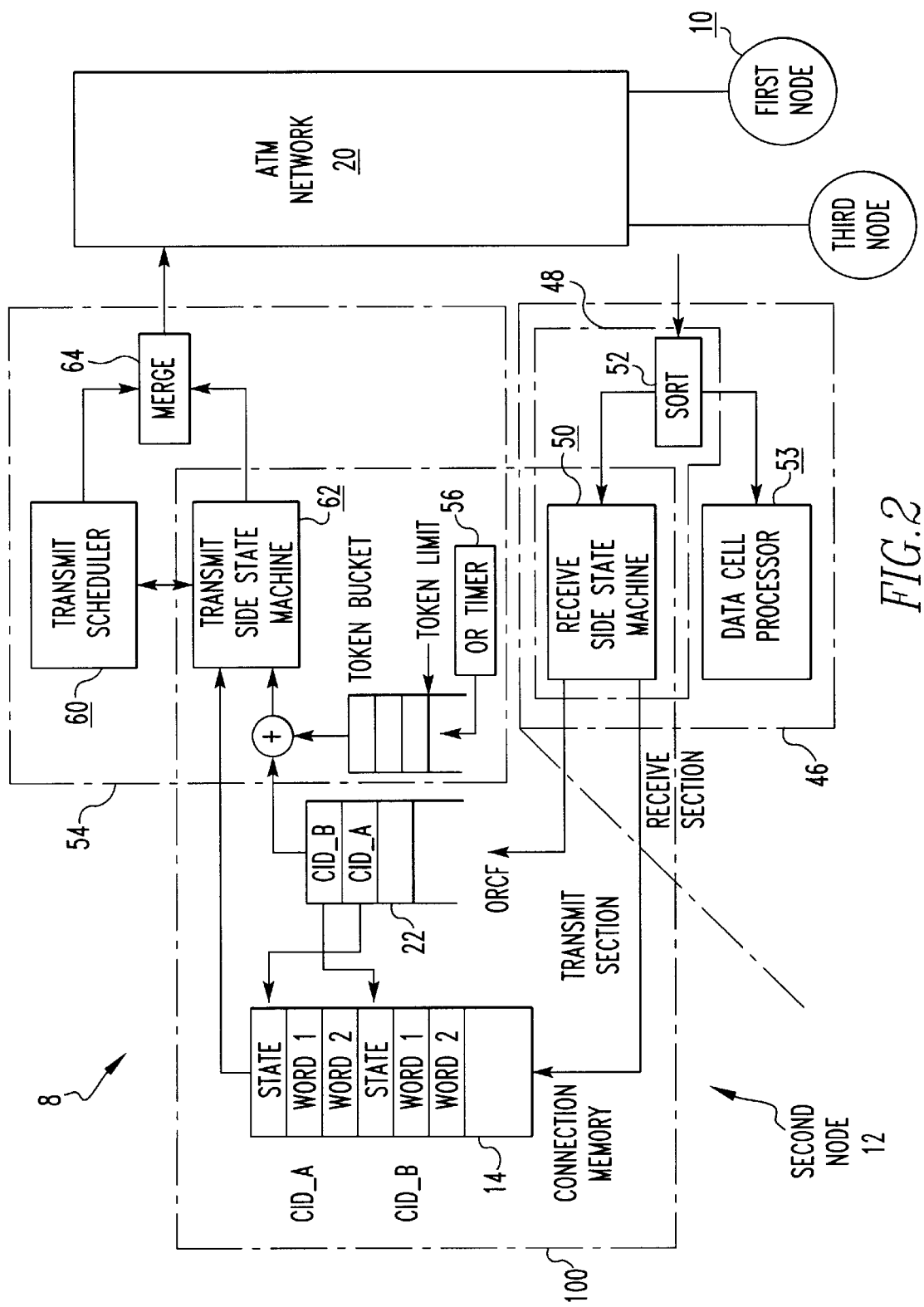
FIG. 2 is a schematic representation of an ATM network according to a preferred embodiment of the present invention.
Figure 3:
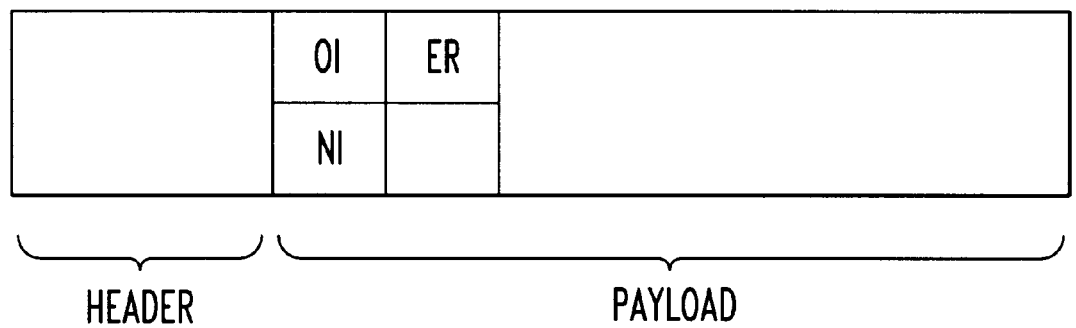
FIG. 3 is a schematic representation of a resource management cell.

Referring now to the drawings wherein like reference numerals refer to similar or identical parts throughout the several views, and more specifically to FIG. 2 thereof, there is shown an ATM telecommunications system 8. The system 8 comprises an ATM network 20 on which cells travel. The system 8 comprises a first node 10 connected to the ATM network 20 which produces at least a first f-RM cell and sends it onto the ATM network 20. The f-RM cell includes ABR information, as shown in FIG. 3. The system comprises a second node 12 connected to the ATM network 20. The second node has a receive section which receives the f-RM cell and a second section which produces a corresponding b-RM cell in response to the f-RM cell and which sends the b-RM cell on to the ATM network 20 back to the first node 10. The b-RM cell includes the ABR information received from the corresponding f-RM cell and modifies the ABR information to reflect congestion regarding cells on the ATM network. The receive section is decoupled from the transmit section.

Preferably, the first node 10 produces ATM cells and the f-RM cell is sent in-band with the ATM cells to the second node 12, and the second node 12 receives the f-RM cell with the ATM cells from the first node 10. The first node 10 preferably forms a connection on the ATM network 20 with the second node 12 to send the f-RM cell to the second node 12, and the second node 12 sends the b-RM cell back to the first node 10 on the connection. Preferably, the second node 12 receives an f-RM cell and sends a corresponding b-RM cell back onto the ATM network 20 at a minimum specified rate.

The second node 12 preferably includes an RM cell processing mechanism 46 which receives the f-RM cell and produces the corresponding b-RM cell with the ABR information modified to reflect congestion regarding cells on the ATM network 20. Preferably, the RM cell processing mechanism 46 includes an RM cell processor 48 which receives the f-RM cell from the ATM network and modifies the ABR information to reflect congestion regarding cells on the ATM network 20. The RM cell processor 48 preferably includes a receive side state machine 50 and a sort 52. The RM cell processor mechanism preferably includes a data cell processor 53. The sort 52 sends a standard ATM cell to the data cell processor 54 for normal processing, as is well known in the art. The sort 52 sends the f-RM cell to the receive side state machine 50 for modification of its payload according to congestion information.

The f-RM cell preferably has a payload which includes the ABR information and the second node 12 has a connection memory 14 which stores the payload of the f-RM cell it receives with the modified ABR information. Preferably, the second node 12 includes a transmit scheduler mechanism 54 which forms the b-RM cell from the payload from the connection memory 14 and sends the b-RM cell to the ATM network 20.

The payload is preferably in the connection memory and is indexed by a connection ID 16 (CID) and the second node 12 includes an RM cell FIFO 22 in which the connection ID 16 for the payload in the connection memory 14 is placed. Preferably, the transmit scheduler mechanism 54 forms the b-RM cell when the connection ID 16 is present in the RM cell FIFO 14. The connection ID 16 points to the corresponding payload in the connection memory 14. The payload preferably has CI, NI and ER fields in words 1 and 2 of the payload and the RM cell processor 48 modifies the CI, NI and ER fields as a function of the congestion states of the second node 12. Preferably, the transmit scheduler mechanism 54 includes an OR timer 56 and a token bucket 58, the OR timer 56 generates a pulse at regular intervals. The pulse causes the token bucket 58 to be incremented. The transmit scheduler mechanism 54 forms the b-RM cell when the token bucket 58 is non-zero and the RM cell FIFO 22 has a connection ID 16. The RM cell FIFO 22, the OR timer 56 and the token bucket 58 assist in allowing the receive section and transmit section to be decoupled from each other.

The transmit scheduler mechanism 54 preferably also comprises a transmit scheduler 60 which schedules b-RM cells and standard ATM cells to be sent to the ATM network 20. The transmit scheduler mechanism 54 preferably also includes a transmit side state machine 62 which forms the b-RM cell and informs the transmit scheduler 60 of the b-RM cell's existence and a merge 64 which inserts the b-RM cell in the cell stream being sent to the ATM network 20. (The first node 10 preferably also has the above structure described for the second node 12 to process f-RM cells and produce b-RM cells.)

The present invention pertains to an apparatus 100 for reflecting an f-RM cell as a b-RM cell, as shown in FIG. 2. The apparatus 100 comprises an RM cell processor 48 which is adapted to receive the f-RM cell from an ATM network 20 and modifies ABR information of the f-RM cell to reflect congestion regarding cells on the ATM network 20. The apparatus 100 comprises a transmit scheduler mechanism 54 connected to the RM cell processor 48 which forms the b-RM cell from the modified ABR information of the f-RM cell and sends the b-RM cell to the ATM network 20. The transmit scheduler is decoupled from the RM cell processor.

Figure 4:
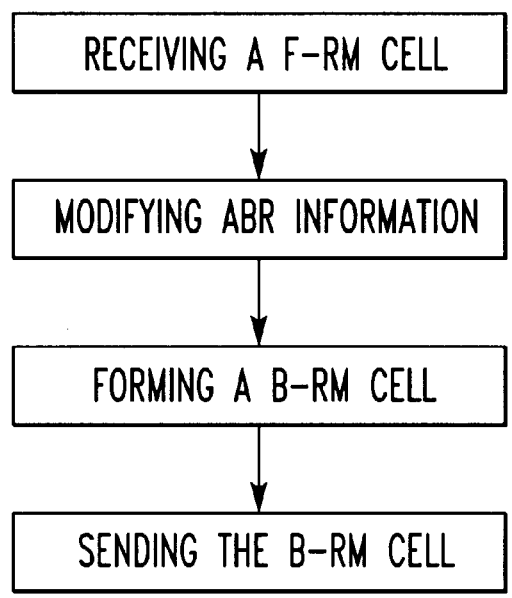
FIG. 4 is a flow chart of a method for reflecting an f-RM cell as a b-RM cell.

Referring to FIG. 4, the present invention pertains to a method for reflecting an f-RM cell as a b-RM cell. The method comprises the steps of receiving an f-RM cell. Then there is the step of modifying ABR information in a f-RM cell received from an ATM network to reflect congestion regarding cells on the ATM network with an RM processor. Then there is the step of forming a b-RM cell with the modified ABR information using a transmit scheduler. Next there is the step of sending the b-RM cell to the ATM network with the transmit scheduler independent from receiving the f-RM cell.

In the operation of the preferred embodiment, RM cells are received from the ATM network 20 by the RM Cell Processor 48. For f-RM cells, the RM Cell Processor 48 modifies the CI, NI and ER fields contained in words 1 and 2 of the cell payload as a function of the congestion state on the end system. The modified words of the RM cell are then written to connection memory 14, indexed by the connection ID (CID) 16 for the cell. The CID 16 is a concatenation of bits from the VPI and VCI fields for the cell. There is also state for the CID 16 which is read from connection memory 14, which are the bRM_pend (b-RM cell Pending) and NBSF (no back since forward) flags. If the bRM_pend flag is clear, then the RM cell processor 48 writes the flag back as set and continues to the next incoming RM cell. If the bRM_pend flag is set, then the CID 16 of the cell is written to the out-of-rate RM cell FIFO 22 (ORCF) and the bRM_pend flag is written back to connection memory 14 unchanged (set).

The transmit scheduler 60 reflects b-RM cells in one of two fashions: in-rate and out-of-rate. In-rate transmission is used when the ATM forum rules for transmission of f-RM cells apply. In normal circumstances, this is performed in the transmission slot following the departure of an f-RM cell. When the transmit scheduler 60 sends an f-RM cell, the NBSF flag in connection memory 14 is set. An in-rate b-RM cell is sent when there is a transmission opportunity for the connection and both the NBSF and bRM_pend flags are set. When a b-RM cell is sent in-rate (CLP bit in the ATM cell header is zero), the state for the CID is read from connection memory 14 and written back with both bRM_pend and NBSF cleared. An RM cell is formed by first creating the ATM cell header with PTI equal to 6 and CLP equal to 0, then reading word 1 and word 2 from connection memory as indexed by the CID. The next 38 bytes in the cell payload are constants, and the final 2 bytes are a CRC-10 value of the cell payload. After formatting, the b-RM cell is then sent to the ATM network 20.

For the out-of-rate transmission case, the transmission is gated by the OR (Out-of-Rate) timer 56 and the token bucket 58. The OR timer 56 is programmed to generate a pulse at regular intervals. When a pulse is generated, the ORCF token bucket 58 is incremented. The token bucket 58 can be incremented up to a programmed limit, the ORCF token limit. An ORCF event is defined when the token bucket 58 is non-zero, the ORCF is non-empty, and a transmission opportunity is granted by the transmit scheduler 60. When an ORCF event occurs, the transmit state machine 62 pulls a CID 16 from the ORCF. The state for the CID 16 is retrieved from connection memory 14. If the bRM_pend bit is clear, then the b-RM cell has already been sent. The transmit scheduler 60 does not send a b-RM cell but does set bRM_pend for the connection. If the bRM_pend flag is set, then a b-RM cell is sent for the connection out-of-rate (CLP bit in the ATM cell header is set to 1). The bRM_pend flag is not changed (still set). The remainder of the RM cell is formed in a fashion identical to that for f-RM cells.

The rate of the OR timer is set by the host according to the anticipated rate at which f-RM cells will be received. If it is anticipated that one of every thirty-two received ATM cells will be an f-RM cell, then the OR timer rate is typically set to one-thirty-second of the link rate to the ATM network.

The ORCF token bucket is set according to the tolerance of the transmit scheduler to bursts of out-of-rate RM cells. If the transmit scheduler is intolerant to bursts, then the limit is set low, with a minimum value of one. Otherwise, the limit is set higher, up to the tolerance of the transmit scheduler.

Figure 5:
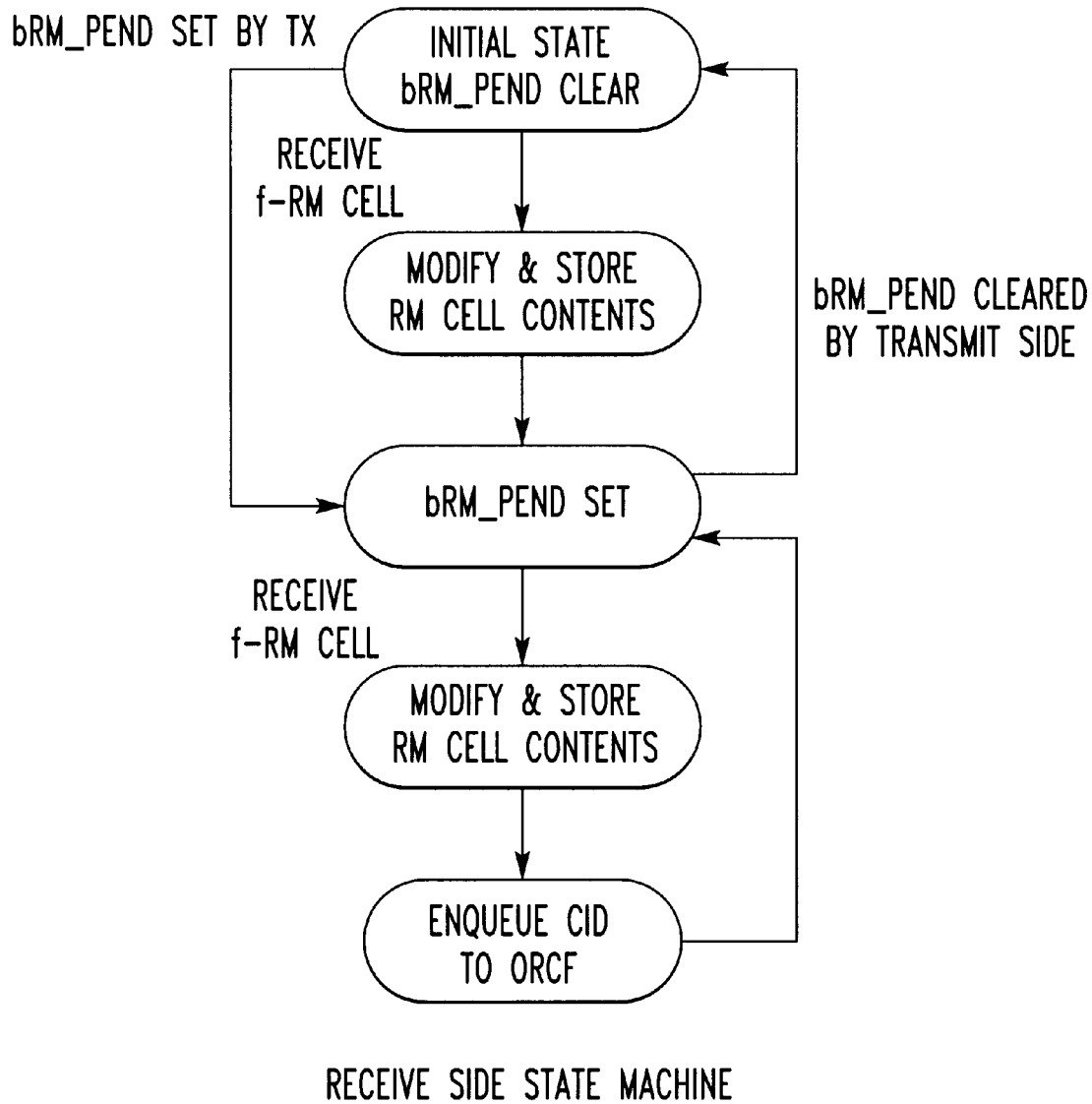
FIG. 5 is a flow chart of a receive side state machine.
Figure 6:
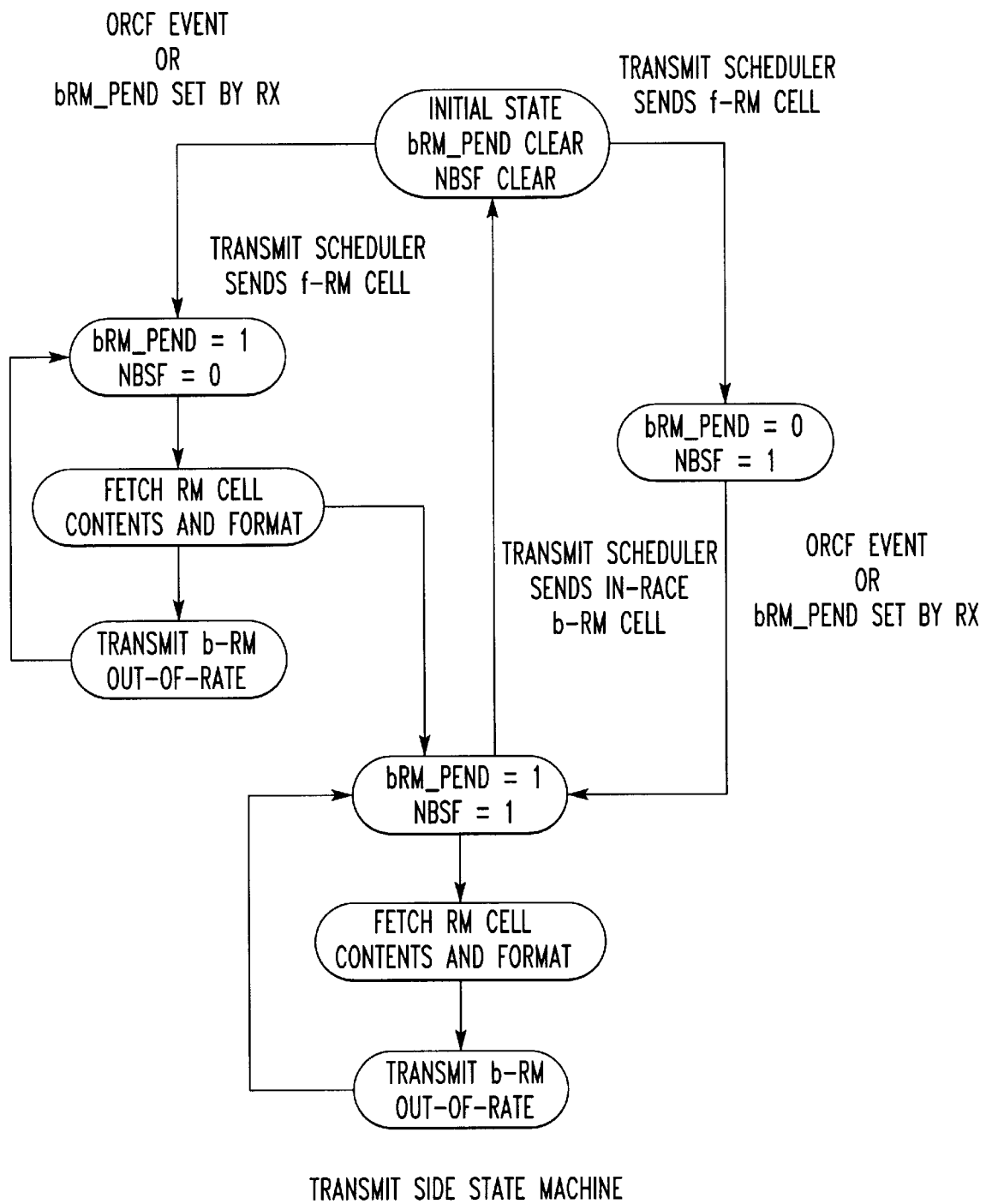
FIG. 6 is a flow chart of a transmit side state machine.

The state machines for the receive and transmit sides give a precise definition of the states defined by NBSF and bRM_pend, and the actions which result when certain events occur. FIG. 5 is a flow chart of the receive side state machine. FIG. 6 is a flow chart of the transmit side state machine.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An ATM telecommunications system comprising:

an ATM network on which cells travel;

a first node connected to the ATM network which produces at least a first f-RM cell and ATM cells and sends them onto the ATM network, said f-RM cell includes ABR information; and a second node connected to the ATM network, said second node having a receive section which receives the f-RM cell and the ATM cells and a transmit section which forms and produces a corresponding in-rate or out-of-rate b-RM cell in response to the f-RM cell, and which sends the b-RM cell on to the ATM network back to the first node separate and independent from the ATM cells, said b-RM cell includes the ABR information received from the corresponding f-RM cell and modifies the ABR information to reflect congestion regarding cells on the ATM network, said receive section decoupled from said transmit section.

2. A system as described in claim 1 wherein the first node produces ATM cells and the f-RM cell is sent in-band with the ATM cells to the second node, and the second node receives the f-RM cell with the ATM cells from the first node.

3. A system as described in claim 2 wherein the first node forms a connection on the ATM network with the second node to send the f-RM cell to the second node, and the second node sends the b-RM cell back to the first node on the connection.

4. A system as described in claim 3 wherein the second node receives an f-RM cell and sends a corresponding b-RM cell back onto the ATM network at a minimum specified rate.

5. A system as described in claim 4 wherein the second node includes an RM cell processing mechanism which receives the f-RM cell and produces the corresponding b-RM cell with the ABR information modified to reflect congestion regarding cells on the ATM network.

6. A system as described in claim 5 wherein the RM cell processing mechanism includes an RM cell processor which receives the f-RM cell from the ATM network and modifies the ABR information to reflect congestion regarding cells on the ATM network.

7. A system as described in claim 6 wherein the f-RM cell has a payload which includes the ABR information and wherein the second node has a connection memory which stores the payload of the f-RM cell it receives with the modified ABR information.

8. A system as described in claim 7 wherein the second node includes a transmit scheduler mechanism which forms the b-RM cell from the payload from the connection memory and sends the b-RM cell to the ATM network.

9. A system as described in claim 8 wherein the payload in the connection memory is indexed by a connection ID and the second node includes an RM cell FIFO in which the connection ID for the payload in the connection memory is placed.

10. A system as described in claim 9 wherein the transmit scheduler mechanism forms the b-RM cell when the connection ID is present in the RM cell FIFO, said connection ID pointing to the corresponding payload in the connection memory.

11. A system as described in claim 10 wherein the payload has congestion indication, no-increase and explicit rate fields in words 1 and 2 of the payload and the RM cell processor modifies the congestion indication, no-increase and explicit rate fields as a function of the congestion states of the second node.

12. A system as described in claim 11 wherein the transmit scheduler mechanism includes an OR timer and a token bucket, the OR timer generates a pulse at regular intervals, said pulse causes the token bucket to be incremented, said transmit scheduler forming the out-of-rate b-RM cell when the token bucket is non-zero and the RM cell FIFO has a connection ID.

13. An apparatus for reflecting an f-RM cell as a b-RM cell comprising:
    an RM cell processing mechanism which is adapted to receive the f-RM cell and ATM cells from an ATM network and modifies ABR information of the f-RM cell to reflect congestion regarding cells on the ATM network; and
    a transmit scheduler mechanism connected to the RM cell processing mechanism which forms either an in-rate or out-of-rate b-RM cell from the modified ABR information of the f-RM cell and sends the b-RM cell to the ATM network separate and independent of the ATM cells, said transmit scheduler decoupled from the RM cell processing mechanism.

14. A method for reflecting an f-RM cell as a b-RM cell comprising the steps of:
    receiving an f-RM cell and ATM cells from an ATM network;
    modifying ABR information in an f-RM cell received from an ATM network to reflect congestion regarding cells on the ATM network with an RM processor;
    forming an in-rate or out-of-rate b-RM cell with the modified ABR information using a transmit scheduler; and
    sending the b-RM cell to the ATM network with the transmit scheduler independent from receiving the f-RM cell and the ATM cells.

15. An apparatus as described in claim 1 wherein the in-rate b-RM cell is sent in a transmission slot by the transmit section following the transmission of the f-RM cell.

16. An apparatus as described in claim 15 wherein the second node has a connection memory and wherein the transmit section sets a first flag in connection memory when an in-rate f-RM cell is sent by the transmit section, and the in-rate b-RM cell is sent when there is a transmission opportunity and both the first flag and a second flag, which identifies a b-RM cell is waiting to be sent, is set.

17. An apparatus as described in claim 16 wherein the first flag is a no back since forward flag and the second flag is a b-RM cell pending flag.

18. An apparatus as described in claim 17 wherein the transmit section includes a timer which generates a pulse and the out-of-rate b-RM cell is transmitted to the ATM network after the pulse is generated and there is a transmission opportunity.

19. An apparatus as described in claim 18 wherein the timer includes an OR timer and wherein the transmit section includes a token bucket, the OR timer generates a pulse at regular intervals, said pulse causes the token bucket to be incremented, said transmit section forming the out-of-rate b-RM cell when the token bucket is non-zero.

20. An apparatus as described in claim 19 wherein the transmit section has a tolerance to bursts of out-of-rate b-RM cells and the token bucket is set according to the tolerance of the transmit scheduler.

21. An apparatus as described in claim 12 wherein the transmit scheduler has a tolerance to bursts of out-of-rate b-RM cells and the token bucket is set according to the tolerance of the transmit scheduler.

22. An apparatus as described in claim 13 wherein the in-rate b-RM cell is sent in a transmission slot by the transmit scheduler mechanism following the transmission of the f-RM cell.

23. An apparatus as described in claim 22 including a connection memory and wherein the transmit scheduler mechanism sets a first flag in the connection memory when an in-rate f-RM cell is sent by the transmit scheduler mechanism, and the in-rate b-RM cell is sent by the transmit scheduler mechanism when there is a transmission opportunity and both the first flag and a second flag, which identifies a b-RM cell is waiting to be sent, is set.

24. An apparatus as described in claim 23 wherein the first flag is a no back since forward flag and the second flag is a b-RM cell pending flag.

25. An apparatus as described in claim 24 wherein the transmit scheduler mechanism includes a timer which generates a pulse and the out-of-rate b-RM cell is transmitted to the ATM network after the pulse is generated and there is a transmission opportunity.

26. An apparatus as described in claim 25 wherein the timer includes an OR timer and wherein the transmit scheduler mechanism includes a token bucket, the OR timer generates a pulse at regular intervals, said pulse causes the token bucket to be incremented, said transmit scheduler mechanism forming the out-of-rate b-RM cell when the token bucket is non-zero.

27. A method as described in claim 14 wherein the sending step includes the step of sending the in-rate b-RM cell in a transmission slot by the transmit section following the transmission of a f-RM cell.

28. A method as described in claim 27 wherein the sending step includes the steps of setting a first flag in a connection memory when an in-rate f-RM cell is sent by the transmit scheduler to the ATM network, and sending the in-rate b-RM cell by the transmit scheduler to the ATM network when there is a transmission opportunity and both the first flag and a second flag, which identifies a b-RM cell is waiting to be sent, is set.

29. A method as described in claim 28 wherein the first flag is a no back since forward flag and the second flag is a b-RM cell pending flag.

30. A method as described in claim 29 wherein after the sending step, there are the steps of generating a pulse with a timer, and transmitting with the transmit section an out-of-rate b-RM cell to the ATM network after the pulse is generated and there is a transmission opportunity.

31. A method as described in claim 30 wherein the generating step includes the step of generating the pulse at regular intervals with an OR timer which causes a token bucket to be incremented, and after the generating step, there is the step of forming the out-of-rate b-RM cell with the transmit scheduler when the token bucket is non-zero.

32. A method as described in claim 31 wherein before the generating step, there is the step of setting the token bucket according to a tolerance to bursts of out-of-rate b-RM cells of the transmit scheduler.

33. An ATM telecommunications system comprising:
an ATM network on which cells travel;
a first node connected to the ATM network which produces at least a first f-RM cell and ATM cells and sends them onto the ATM network, said f-RM cell includes ABR information; and
a second node connected to the ATM network, said second node having a receive section which receives the f-RM cell and the ATM cells and a transmit section which forms and produces a corresponding b-RM cell in response to the f-RM cell, and which sends the b-RM cell on to the ATM network back to the first node separate and independent from the ATM cells, said b-RM cell includes the ABR information received from the corresponding f-RM cell and modifies the ABR information to reflect congestion regarding cells on the ATM network, said receive section decoupled from said transmit section, the f-RM cell has a payload which includes the ABR information and wherein the second node has a connection memory which stores the payload of the f-RM cell it receives with the modified ABR information, the second node includes an RM cell processing mechanism which receives the f-RM cell and produces the corresponding b-RM cell with the ABR information modified to reflect congestion regarding cells on the ATM network, the RM cell processing mechanism includes an RM cell processor which receives the f-RM cell from the ATM network and modifies the ABR information to reflect congestion regarding cells on the ATM network, the second node receives an f-RM cell and sends a corresponding b-RM cell back onto the ATM network at a minimum specified rate, wherein the first node produces ATM cells and the first f-RM cell is sent in-band with the ATM cells to the second node, and the second node receives the f-RM cell with the ATM cells from the first node, the first node forms a connection on the ATM network with the second node to send the f-RM cell to the second node, and the second node sends the b-RM cell back to the first node on the connection.

34. A system as described in claim 33 wherein the second node includes a transmit scheduler mechanism which forms the b-RM cell from the payload from the connection memory and sends the b-RM cell to the ATM network.

35. A system as described in claim 34 wherein the payload in the connection battery is indexed by a connection ID and the second node includes an RM cell FIFO in which the connection ID for the payload in the connection memory is placed.

36. A system as described in claim 35 wherein the transmit scheduler mechanism forms the b-RM cell when the connection ID is present in the RM cell FIFO, said connection ID pointing to the corresponding payload in the connection memory.

37. A system as described in claim 36 wherein the second node has congestion states and wherein the payload has congestion indication, no-increase and explicit rate fields in words 1 and 2 of the payload and the RM cell processor modifies the congestion indication, no-increase and explicit rate fields as a function of the congestion states of the second node.

38. A system as described in claim 37 wherein the transmit scheduler mechanism includes an OR timer and a token bucket, the OR timer generates a pulse at regular intervals, said pulse causes the token bucket to be incremented, said transmit scheduler forming the b-RM cell when the token bucket is non-zero and the RM cell FIFO has a connection ID.

39. An apparatus for reflecting an f-RM cell as a b-RM cell comprising:
an RM cell processor which is adapted to receive the f-RM cell and ATM cells from an ATM network and modifies ABR information of the f-RM cell to reflect congestion regarding cells on the ATM network; and
a transmit scheduler connected to the RM cell processor which forms the b-RM cell from the modified ABR information of the f-RM cell and sends the b-RM cell to the ATM network separate and independent of the ATM cells, said transmit scheduler decoupled from the RM cell processor.

40. A method for reflecting an f-RM cell as a b-RM cell comprising the steps of:
receiving an f-RM cell and ATM cells from an ATM network;
modifying ABR information in an f-RM cell received from an ATM network to reflect congestion regarding cells on the ATM network with an RM processor;
forming a b-RM cell with the modified ABR information using a transmit scheduler; and
sending the b-RM cell to the ATM network with the transmit scheduler independent from receiving the f-RM cell and the ATM cells.

* * * * *